United States Patent
Chen et al.

(10) Patent No.: US 11,954,919 B2
(45) Date of Patent: Apr. 9, 2024

(54) TRAFFIC LIGHT ACTIVE LEARNING PIPELINE

(71) Applicant: TOYOTA RESEARCH INSTITUTE, INC., Los Altos, CA (US)

(72) Inventors: Kun-Hsin Chen, Mountain View, CA (US); Peiyan Gong, Ann Arbor, MI (US); Shunsho Kaku, Mountain View, CA (US); Sudeep Pillai, Santa Clara, CA (US); Hai Jin, Los Altos, CA (US); Sarah Yoo, Mountain View, CA (US); David L. Garber, Palo Alto, CA (US); Ryan W. Wolcott, Ann Arbor, MI (US)

(73) Assignee: TOYOTA RESEARCH INSTITUTE, INC., Los Altos, CA (US)

(*) Notice: Subject to any disclaimer, the term of this patent is extended or adjusted under 35 U.S.C. 154(b) by 451 days.

(21) Appl. No.: 17/066,351

(22) Filed: Oct. 8, 2020

(65) Prior Publication Data

US 2022/0114375 A1    Apr. 14, 2022

(51) Int. Cl.
*G06V 20/58*    (2022.01)
*G01C 21/32*    (2006.01)
*G06N 3/08*     (2023.01)
*H04W 4/44*     (2018.01)

(52) U.S. Cl.
CPC .......... *G06V 20/584* (2022.01); *G01C 21/32* (2013.01); *G06N 3/08* (2013.01); *H04W 4/44* (2018.02)

(58) Field of Classification Search
CPC ....... G06V 20/584; H04W 4/44; G01C 21/32; G06N 3/08
See application file for complete search history.

(56) References Cited

U.S. PATENT DOCUMENTS

| | | | |
|---|---|---|---|
| 10,300,894 B2* | 5/2019 | Rawashdeh | G06V 20/584 |
| 2018/0322785 A1* | 11/2018 | Jerichow | G08G 1/162 |
| 2019/0251838 A1* | 8/2019 | Bernhardt | G08G 1/087 |
| 2019/0385288 A1* | 12/2019 | Stewart | G06T 5/002 |
| 2020/0065711 A1* | 2/2020 | Clément | B60W 40/02 |

(Continued)

OTHER PUBLICATIONS

Du, X. et al., "Vision-Based Traffic Light Detection for Intelligent Vehicles," 2017 4th International Conference on Information Science and Control Engineering, found at https://ieeexplore.ieee.org/abstract/document/8110503.

(Continued)

*Primary Examiner* — Qun Shen
(74) *Attorney, Agent, or Firm* — SHEPPARD, MULLIN, RICHTER & HAMPTON LLP; Hector A. Agdeppa; Daniel N. Yannuzzi

(57) ABSTRACT

Systems and methods are provided for developing/updating training datasets for traffic light detection/perception models. V2I-based information may indicate a particular traffic light state/state of transition. This information can be compared to a traffic light perception prediction. When the prediction is inconsistent with the V2I-based information, data regarding the condition(s)/traffic light(s)/etc. can be saved and uploaded to a training database to update/refine the training dataset(s) maintained therein. In this way, an existing traffic light perception model can be updated/improved and/or a better traffic light perception model can be developed.

14 Claims, 8 Drawing Sheets

(56) References Cited

U.S. PATENT DOCUMENTS

| | | | |
|---|---|---|---|
| 2020/0134333 A1 | 4/2020 | Kumar | |
| 2020/0231142 A1* | 7/2020 | Liu | G05D 1/0246 |
| 2020/0388033 A1* | 12/2020 | Matlock | G06V 10/26 |
| 2021/0009365 A1* | 1/2021 | Ganesh | G01C 21/26 |
| 2022/0097708 A1* | 3/2022 | Jin | G06V 20/584 |
| 2022/0101112 A1* | 3/2022 | Brown | G10L 15/063 |

OTHER PUBLICATIONS

Salarian, M. et al., "A Vision Based System for Traffic Lights Recognition," SAI Intelligent Systems Conference 2015, Nov. 10-11, 2015, London, UK, found at https://www.researchgate.net/profile/Mahdi_Salarian/publication/306276749_A_vision_based_system_for_traffic_lights_recognition/links/57c0806f08aeb95224d4a2b6.pdf.

García-Garrido, M. et al., Complete Vision-Based Traffic Sign Recognition Supported by an 12V Communication System, Sensors 2012, found at https://www.mdpi.com/1424-8220/12/2/1148/pdf.

Saini, Sanjay et al., "An Efficient Vision-Based Traffic Light Detection and State Recognition for Autonomous Vehicles," 2017 IEEE Intelligent Vehicles Symposium (IV) Jun. 11-14, 2017, Redondo Beach, CA, USA, found at https://www.researchgate.net/profile/Sanjay_Saini5/publication/318802136_An_efficient_vision-based_traffic_light_detection_and_state_recognition_for_autonomous_vehicles/links/59dc9215a6fdcc1ec8a6fdd2/An-efficient-vision-based-traffic-light-detection-and-state-recognition-for-autonomous-vehicles.pdf.

* cited by examiner

TRAFFIC LIGHT ACTIVE LEARNING PIPELINE

TECHNICAL FIELD

The present disclosure relates generally to developing and training machine learning models for traffic light detection and perception.

DESCRIPTION OF RELATED ART

Traffic light perception or detection, e.g., recognizing the presence/existence of a traffic light as well as predicting a traffic light state, is a fundamental capability required in autonomous driving, especially in urban environments, where traffic lights can be encountered rather frequently, e.g., every block. In order for autonomous vehicles, or even vehicles using assisted driving systems, e.g., advanced assisted driving systems (ADAS), to traverse roadways with traffic lights, those traffic lights must be accurately perceived so that the traffic flow they control can progress properly.

BRIEF SUMMARY OF THE DISCLOSURE

In accordance with one embodiment, a method may comprise predicting a state of a traffic signal, and obtaining vehicle-to-infrastructure (V2I)-based information regarding the state of the traffic signal. The method may further comprise comparing the predicted state of the traffic signal with the V2I-based information regarding the state of the traffic signal. In response to a determination that the predicted state of the traffic signal is inconsistent with that of the V2I-based information regarding the state of the traffic signal, saving data related to the state of the traffic signal for updating training data for developing a model used to predict the state of the traffic signal.

In some embodiments, the method may further comprise translating at least one of the predicted state of the traffic signal and the V2I-based information regarding the state of the traffic signal to a common format to facilitate the comparison.

In some embodiments, the method may further comprise annotating the saved data.

In some embodiments, the saved data is related to the state of the traffic signal based on at least one timestamp common to or within a time period associated with one or more captured images on which the predicted state of the traffic signal is based.

In some embodiments, the method may further comprise uploading the saved data to a training dataset database.

In response to a determination that the predicted state of the traffic signal is consistent with that of the V2I-based information regarding the state of the traffic signal, the method may comprise not uploading data upon which the predicted state of the traffic signal is based to the training dataset database.

In some embodiments, the method may further comprise receiving high definition map-based information regarding the state of the traffic signal.

In some embodiments, the method may further comprise further comparing the received high definition map-based information with the predicted state of the traffic signal.

In some embodiments, the saved data comprises, at least in part, the received high definition map-based information.

In accordance with another embodiment, a vehicle may include a traffic light recognition system, comprising: a camera; traffic light detector circuitry controlled by a control unit operative to: predict a state of a traffic signal based on one or more images of the traffic signal captured by the camera and application of a machine learning model to the one or more images; obtain vehicle-to-infrastructure (V2I)-based information regarding the state of the traffic signal; compare the predicted state of the traffic signal with the V2I-based information regarding the state of the traffic signal; and in response to a determination that the predicted state of the traffic signal is inconsistent with that of the V2I-based information regarding the state of the traffic signal, update a training dataset for the machine learning model with the one or more images.

In some embodiments, the control unit is further operative to translate at least one of the predicted state of the traffic signal and the V2I-based information regarding the state of the traffic signal to a common format to facilitate the comparison.

In some embodiments, the traffic light detector circuitry controlled by a control unit is further operative to: in response to a determination that the predicted state of the traffic signal is consistent with that of the V2I-based information regarding the state of the traffic signal, prevent the updating of the training dataset with the one or more images.

In some embodiments, the traffic light detector circuitry controlled by a control unit is further operative to: receive high definition map-based information regarding the state of the traffic signal.

In some embodiments, the traffic light detector circuitry controlled by a control unit is further operative to: further compare the received high definition map-based information with the predicted state of the traffic signal.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
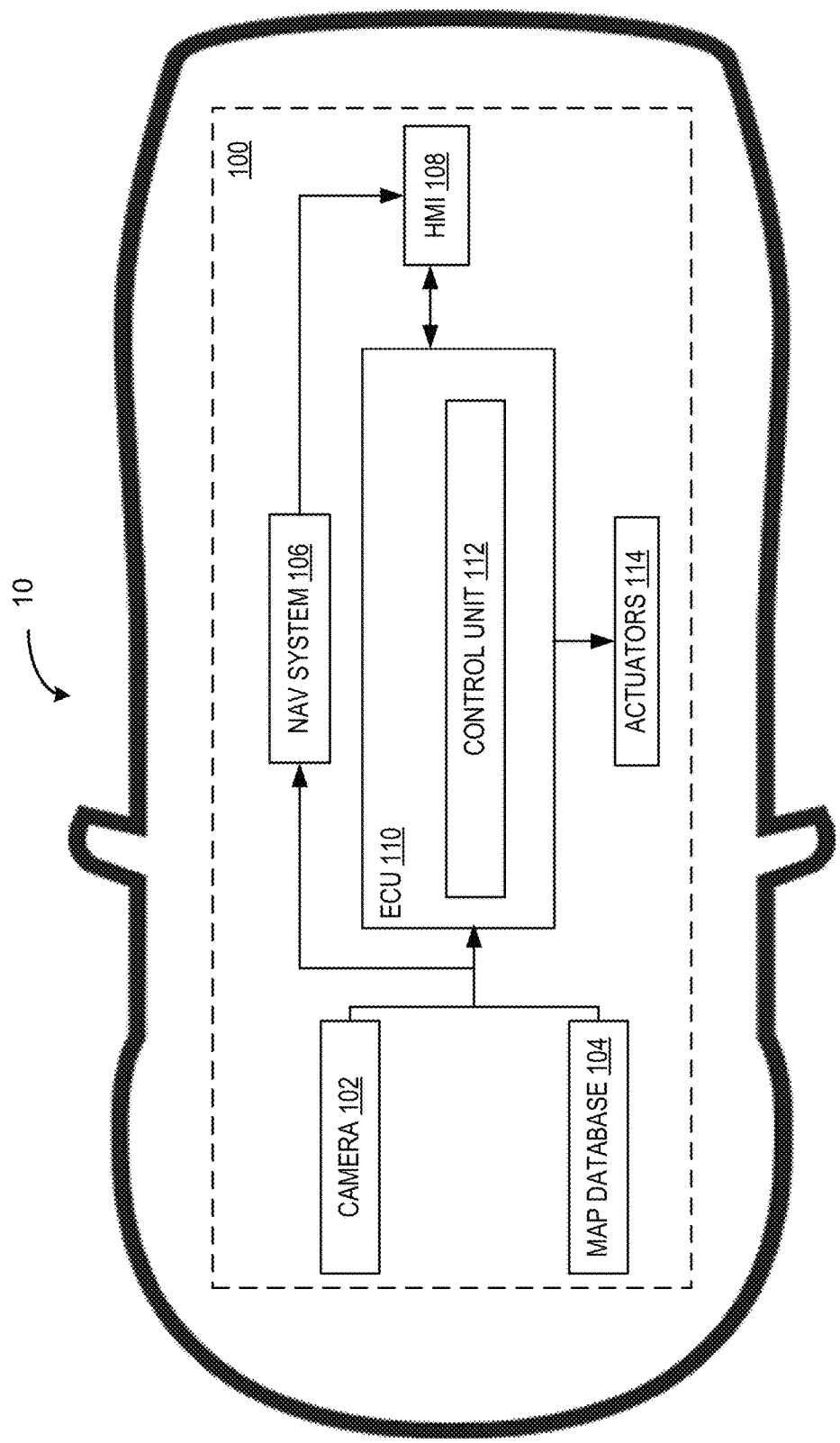
FIG. 1 illustrates an example vehicle with which data for training a traffic light perception model may be captured and in which traffic light perception may be performed.

The figures are not exhaustive and do not limit the present disclosure to the precise form disclosed.

DETAILED DESCRIPTION

As alluded to above, vehicles such as autonomous vehicles and ADAS-equipped vehicles should be able to accurately perceive traffic lights encountered on roadways that such vehicles traverse. One way to address traffic light perception or detection can be to employ machine learning to train models so that the models will be able to accurately recognize the presence/existence of traffic lights and perceive different traffic light states, for example. However, as is typically the case with most, if not all other learning-based computer vision models, such models tend to be premised upon supervised training methods that rely heavily on large-scale annotated datasets. Indeed, research has shown that the performance of a learning-based model increases commensurately with an increase in the amount of data used to train the model. In other words, more training data tends to equate to better model prediction.

Unfortunately, collecting, curating and annotating a traffic light dataset can be expensive due to, e.g., the number of different traffic light configurations across various regions, environmental conditions/considerations that might impact traffic light perception, etc. Moreover, in some instances, the data that is collected can be redundant relative to other, already-collected data, and thus, does not further the training of a model, e.g., does not result in better perception. Such redundant data collection not only increases the cost of labeling jobs and data transmission fees from vehicles to a datastore, e.g., centralized database, but can also slow down the model training process, and may even be potentially harmful to model performance. For example, repeated training on the same/similar data or types of data can, in some cases, result in overfitting or overfitted model. That is, more training data, when not redundant/repetitious, tends to equate to a better model, and additionally, a more diverse training dataset(s) covering a wide range of scenarios and conditions (e.g., geo-location, weather, lighting conditions, etc.) can be a large factor in successful learning-based detection.

Accordingly, some embodiments are directed to an active learning pipeline system or mechanism that can utilize Vehicle to Infrastructure (V2I) information regarding traffic light characteristics/operating condition(s) as a baseline against which traffic light detection derived from a machine learning model can be compared. That is, traffic light V2I information can be used as a "validator" to determine the accuracy of/validate a traffic light detector. In some embodiments, the V2I information can be assumed/deemed to be some baseline of accuracy, but it is not necessary that the V2I information be absolutely correct at all times. Rather, the V2I information may be a more reliable source of traffic light state/transition information compared to a model-based traffic light detection system. When an inconsistency is identified as a result of the comparison, information relevant to the inconsistent or divergent prediction can be extracted for use as training data for the model. It should be understood that in some embodiments, such information can be extracted and used as training data even if the inconsistency may be due to the V2I (or other) information against which a traffic light prediction is compared. That is, data that may be of interest from a training data standpoint may be captured/used regardless of whether it is the V2I information or the prediction information that is inconsistent with an actual traffic light state/transition. The active learning pipeline contemplated and described herein can assist with efficiently identifying "interesting" data that, e.g., a current model may be uncertain about (the current model tends to fail when making predictions based on the data). Such interesting data or samples thereof can be included to arrive at a more diverse training dataset, that might otherwise merely grow (at a high cost) without providing useful data to learn from.

For example, upon comparing a traffic light detector's recognition of and/or prediction regarding a traffic light or signal to V2I-derived traffic light information (presence/location/state/condition) and determining that they are not consistent with one another, images at/around the relevant time of detection can be collected and auxiliary metadata can be uploaded, e.g., to a centralized training database to supplement the existing model training dataset. Additionally, the perception instance can be piped into a traffic light data curation/annotation pipeline for Extract, Transform, Load (ETL) jobs. In this way, more challenging/the most challenging data samples for a traffic light detector can be identified and used to train the traffic light detector, making the traffic light detector more robust.

It should be understood that the terms "traffic light(s)" and "traffic signal(s)" may be used interchangeably in the present disclosure. A traffic light/signal can refer to any signaling device positioned at road intersections, pedestrian crossings, and other locations for controlling the flow of vehicular traffic. Although various embodiments are described in the present disclosure in the context of automotive vehicles/traffic, various embodiments have applicability in other contexts where some form of prediction can be compared to some baseline.

FIG. 1 illustrates an example vehicle 10 that may necessitate the ability to handle/perceive traffic lights, such as an autonomous vehicle, mapping vehicle, etc. It should be understood that various embodiments disclosed herein may be applicable to/used in various vehicles (internal combustion engine (ICE) vehicles, fully electric vehicles (EVs), etc.) that are fully or partially autonomously controlled/operated.

It should be understood that a vehicle such as vehicle 10 may have some form of a drive force unit (e.g., an engine, motor generators (MGs)), a battery, a transmission, a memory, an electronic control unit (ECU), and/or other components not necessarily illustrated herein. However, some relevant components are described below.

FIG. 1 illustrates an example autonomous control system 100 that may be used to autonomously control vehicle 10. Autonomous control system 100 may be installed in vehicle 10, and executes autonomous control of vehicle 10. As described herein, autonomous control can refer to control that executes driving/assistive driving operations such as acceleration, deceleration, and/or steering of a vehicle, generally movement of the vehicle, without depending or relying on driving operations/directions by a driver or operator of the vehicle.

As an example, autonomous control may include a lane keeping assist control where a steering wheel (not shown) is steered automatically (namely, without depending on a steering operation by the driver) such that vehicle 10 does not depart from a running lane. That is, the steering wheel is automatically operated/controlled such that vehicle 10 runs along the running lane, even when the driver does not perform any steering operation.

An ECU 110 may include circuitry to control the above aspects of vehicle operation. ECU 150 may include, for example, a microcomputer that includes a one or more processing units (e.g., microprocessors), memory storage (e.g., RAM, ROM, etc.), and I/O devices. ECU 110 may execute instructions stored in memory to control one or more electrical systems or subsystems in the vehicle. ECU 110 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., anti-lock braking system (ABS) or electronic stability control (ESC)), battery management systems, and so on. These various control units can be implemented using two or more separate electronic control units, or using a single electronic control unit.

In the example shown in FIG. 1, autonomous control system 100 is provided with a plurality of sensors, such as one or more external sensors (one of which may be a camera 102, a Global Positioning System (GPS) reception unit (not shown), an internal sensor(s) (not shown), a map database 104, a navigation system 106, an HMI (Human Machine Interface) 108, and actuators 114. Autonomous control system 100 may communicate with ECU 110, or in some embodiments (may be implemented with its own ECU).

In the example shown in FIG. 1, the aforementioned external sensors, one of which may be embodied as camera 102, can be detectors or part of a detector(s) that detect external circumstances such as surrounding information of vehicle 10.

Camera 102 may be an imaging device that images the external circumstances surrounding vehicle 10. For example, camera 102 can be provided on a back side of a front windshield of vehicle 10, and camera 102 may be a monocular camera or a stereo camera, a still camera, a video camera, a color camera, etc. Vehicle 10 may have multiple cameras located in different areas of vehicle 10. Such cameras, including camera 102 may output, to the ECU 110, image information regarding the external circumstances surrounding vehicle 10. In the context of traffic light perception, camera 102 may detect and capture one or more images that ultimately may be determined to be a traffic light that is processed to determine the status/characteristics of the traffic light.

A map database 104 may be a database including map information. The map database 104 is implemented, for example, in a disk drive or other memory installed in vehicle 10. The map information may include road position information, road shape information, intersection position information, and fork position information, for example. The road shape information may include information regarding a road type such as a curve and a straight line, and a curvature angle of the curve. When autonomous control system 100 uses a Simultaneous Localization and Mapping (SLAM) technology or position information of blocking structural objects such as buildings and walls, the map information may further include an output signal from an external sensor, such as camera 102. In some embodiments, map database 104 may be a remote data base or repository with which vehicle 10 communicates. In some embodiments, map database 104 may further include information regarding the existence and, e.g., general location/position of a traffic light(s) along roads, at intersections, etc. It should be understood that map database 104 may be resident in vehicle 10 or may be implemented at a remote server and accessed by autonomous control system 100.

Navigation system 106 may be a component or series of interoperating components that guides vehicle 10 to a destination on a map designated in map database 104, for example. That is, navigation system 106 may calculate a route followed or to be followed by vehicle 10, based on the position information of vehicle 10 measured by the aforementioned GPS reception unit and map information of map database 104. The route may indicate a running lane of a section(s) of roadway in which vehicle 10 traverses, for example. Navigation system 106 calculates a target route from the current position of vehicle 10 to the destination, and notifies a passenger of vehicle 10, for example, of the target route through a display, e.g., a display of a head unit, which may be an embodiment of HMI 108. The navigation system 106 outputs, to the ECU 110, information of the target route for vehicle 10. In some embodiments, navigation system 106 may use information stored in a remote database, like map database 104, and/or some information processing center with which vehicle 10 can communicate. A part of the processing executed by the navigation system 106 may be executed remotely as well.

ECU 110 may execute autonomous control of the vehicle, and may include, among other components, a control unit 112. Control unit 112 can autonomously control vehicle 10 based on the navigation plan generated by a navigation plan generation unit (not shown). The control unit 112 outputs, to the actuators 114, control signals according to the navigation plan. That is, the control unit 112 controls actuators 114 based on the navigation plan, and thereby autonomously controls one or more aspects of vehicle 10 to traverse one or more roadways in accordance with the navigation plan. Actuators 114 may comprise one or more interfaces to, e.g., drive units of vehicle 10, e.g., a throttle that controls engine operation.

Figure 2:
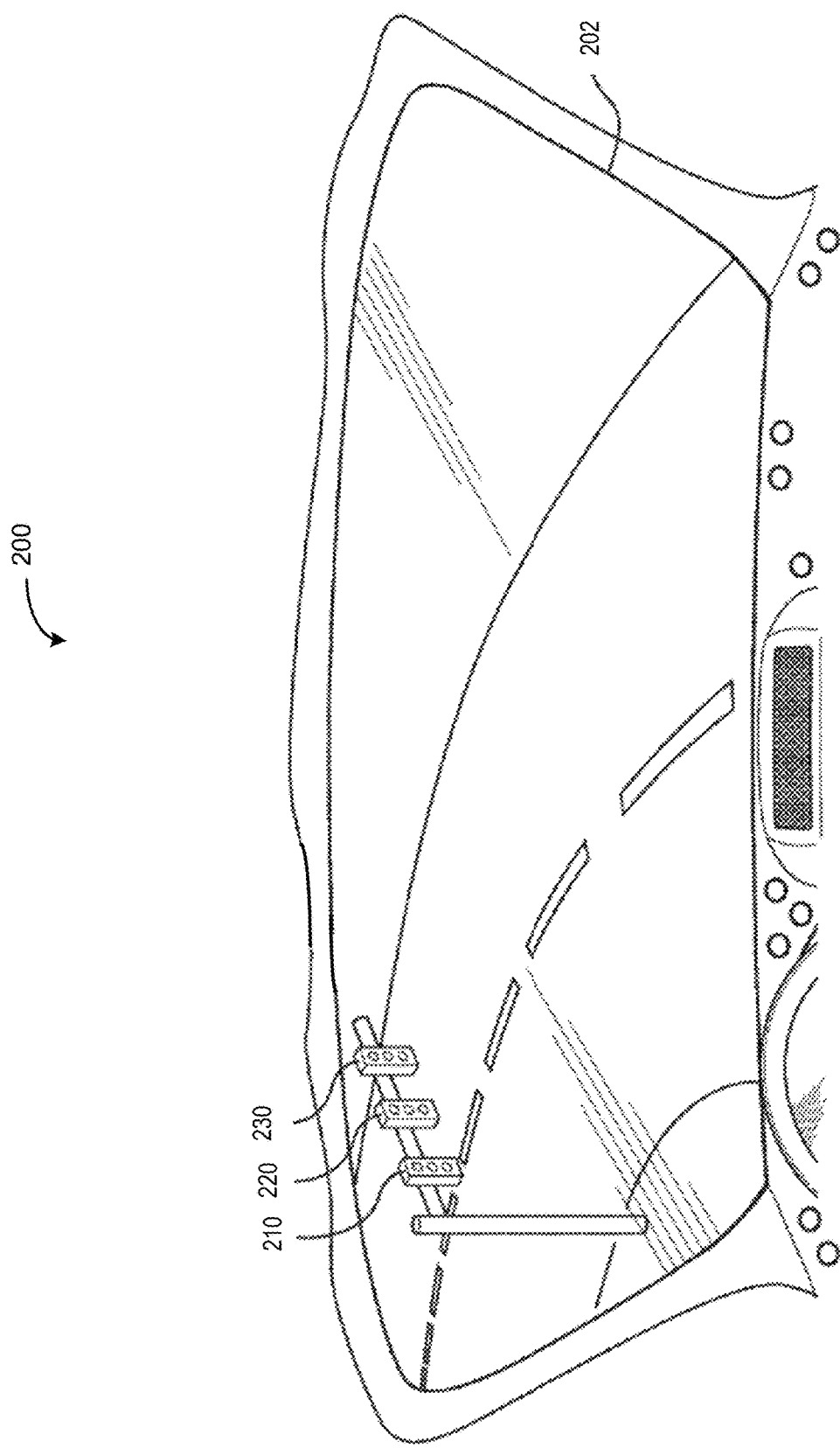
FIG. 2 is an example view of traffic lights from a vehicle.

FIG. 2 is an example view 200 from a vehicle, such as vehicle 10 of FIG. 1, approaching traffic signals 210, 220, 230 at a curve in a road on which vehicle 10 is travelling. A camera or other image capture device, such as camera 102, may capture an image 202 of the upcoming roadway. Image 202 may reflect the one or more traffic signals 210, 220, 230. A traffic light detection component or detector (described below) of vehicle 10 may create a region of interest in an attempt to detect the state of the traffic signals 210, 220, 230. In this case, three regions of interest about/proximately surrounding traffic signals 210, 220, 230 may be created by the traffic light detection component. Regions of interest may be determined based on previously stored information about the traffic lights depicted in image 150. For example, locations of traffic signals 210, 220, 230 may have been previously mapped and regions of interest may have been associated with locations on the map.

It should be noted that traffic signals can differ from region to region, municipality to municipality, country to country, etc. For example, traffic signals in the United States tend to comprise a generally vertical (although sometimes horizontal) arrangement of three bulbs (or light emitting components such as light emitting diode (LED) arrays arranged in a round, bulb-like shape) one atop another. Typically a red bulb is the top-most bulb, a yellow bulb is the middle bulb, and a green bulb is the bottom bulb. Such traffic signals may cycle through an illumination sequence that can go, e.g., from red (indicating oncoming vehicles should stop) to green (indicating oncoming vehicles may go, e.g., straight) to yellow (indicating oncoming vehicles should slow down to a stop). This cycle may then repeat. Some traffic signals may include another bulb/light such as an green arrow (indicating to oncoming vehicle to turn in the direction of the green arrow). Some traffic signals may only have one bulb/light, such as a red bulb that blinks (indicating that oncoming vehicles should stop, but are then allowed to proceed after checking cross-traffic).

In other countries, such as Japan, for example, traffic signals may be generally oriented in a horizontal fashion, and may include multiple, e.g., two, rows of bulbs/lights. For example, a top row of the traffic signal may have three bulbs or light arrays, the left-most being a green bulb, the middle being a yellow bulb, and the right-most being a red bulb. Below that, a second row, may comprise, e.g., four bulbs/lights. The left-most bulb may be a green diagonal left-down pointing arrow. The next bulb may be a green diagonal left-up pointing arrow. The next bulb may be a green up pointing arrow. The right-most bulb may be a green right-pointing arrow.

Figure 3:
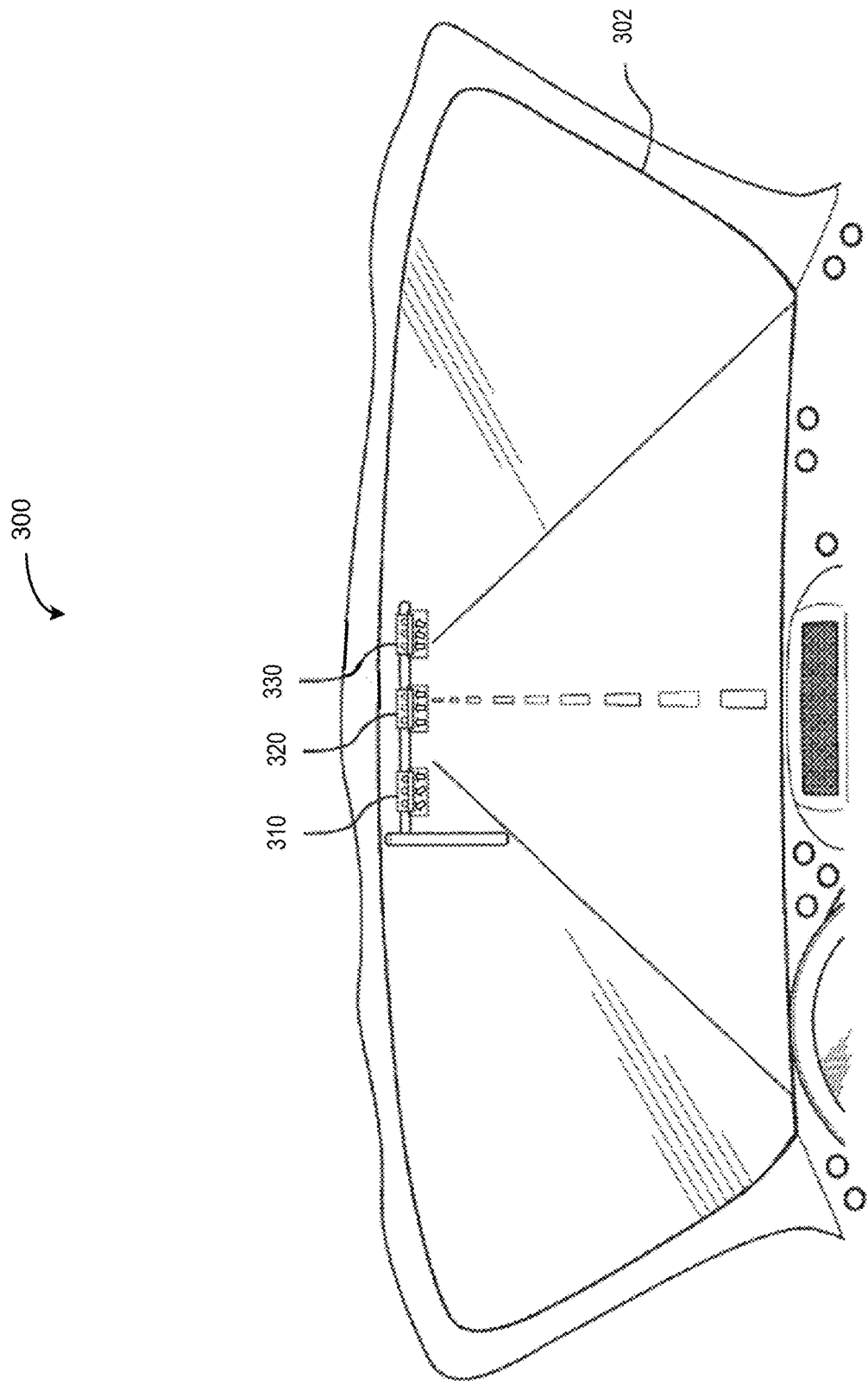
FIG. 3 is another example view of traffic lights from a vehicle.

FIG. 3 is an example view 300 from a vehicle, such as vehicle 10 of FIG. 1, of approaching traffic signals 310, 320, 330 at a curve in a road on which vehicle 10 is travelling. A camera or other image capture device, such as camera 102, may capture an image 302 of the upcoming roadway. Image 302 may reflect the one or more traffic signals 310, 320, 330. A traffic light detection component (described below) of vehicle 10 may create a region of interest in an attempt to detect the state of the traffic signals 310, 320, 330. In this case, three regions of interest about/proximately surrounding traffic signals 310, 320, 330 may be created by the traffic light detection component. Regions of interest may be determined based on previously stored information about the traffic lights depicted in image 302. For example, locations of traffic signals 310, 320, 330 may have been previously mapped and regions of interest may have been associated with locations on the map. Here, traffic signals 310, 320, 330 have characteristics that differ from traffic signals 310, 320, 330, e.g., traffic signals 310, 320, 330 are oriented horizontally as opposed to vertically, and have two rows of bulbs/lights. Moreover, whereas traffic signals 310, 320, 330 comprise solid, round bulb shapes, traffic signals 310, 320, 330 comprise both solid, round, bulb shapes, and additionally, solid, directional arrow shapes.

As will be described below, perceiving traffic signals, such as traffic signals 210, 220, 230, 310, 320, and 330 may involve detecting traffic signals, detecting various characteristics of the traffic signals (upon a determination that a detected object is a traffic signal), and determining certain characteristics indicative of the command(s) the traffic signal intends to relay to vehicles. Shape/geometry as described above with reference to FIGS. 2 and 3, is one such characteristic, and as alluded to above and further described herein, other characteristics may include color, whether or not a traffic bulb is projecting solid light or is flashing, etc.

Machine learning generally involves developing a model, i.e., a mathematical representation of a real-world process, where the model is able to make predictions about that real-world process. To generate a model, typically, training data is provided or input into a machine learning algorithm by means of a known dataset before application of the model in real-world scenarios or situations. In supervised learning, one method or subset of machine learning, applicable machine learning algorithms are trained on data that has been labeled or classified or otherwise categorized. Therefore, successful implementation of such machine learning algorithms depends on the accuracy with which that labeling/annotation/classification is performed. Ultimately, a model should be able to accurately predict/estimate what a detected traffic signal is conveying, whether in the real world, in a simulation, etc.

Typically, when labeling or annotation is required in supervised learning, such as is the case when trying to identify images, video, or other data that involves some human sensory response, such labeling/annotating is typically performed by human labelers. However, when significant amounts of data are at issue, as is the case when using machine learning to develop and train models that are able to perceive traffic signals, the amount of labeling/annotating can be commensurately significant, and thus automated annotation can be useful. Moreover, balanced data collection is desirable in machine learning to avoid any model bias, i.e., for each category or data, it is desirable to have an equivalent amount of data. In machine learning, "rare" classes or categories associated with less data tend to be ignored by models, whereas a goal in supervised learning is to penalize the model for predicting an incorrect state, e.g., perceiving a traffic light as commanding an oncoming vehicle to stop, when in actuality, the traffic light was commanding oncoming vehicles go straight. This results in better training of the model.

Figure 4A:
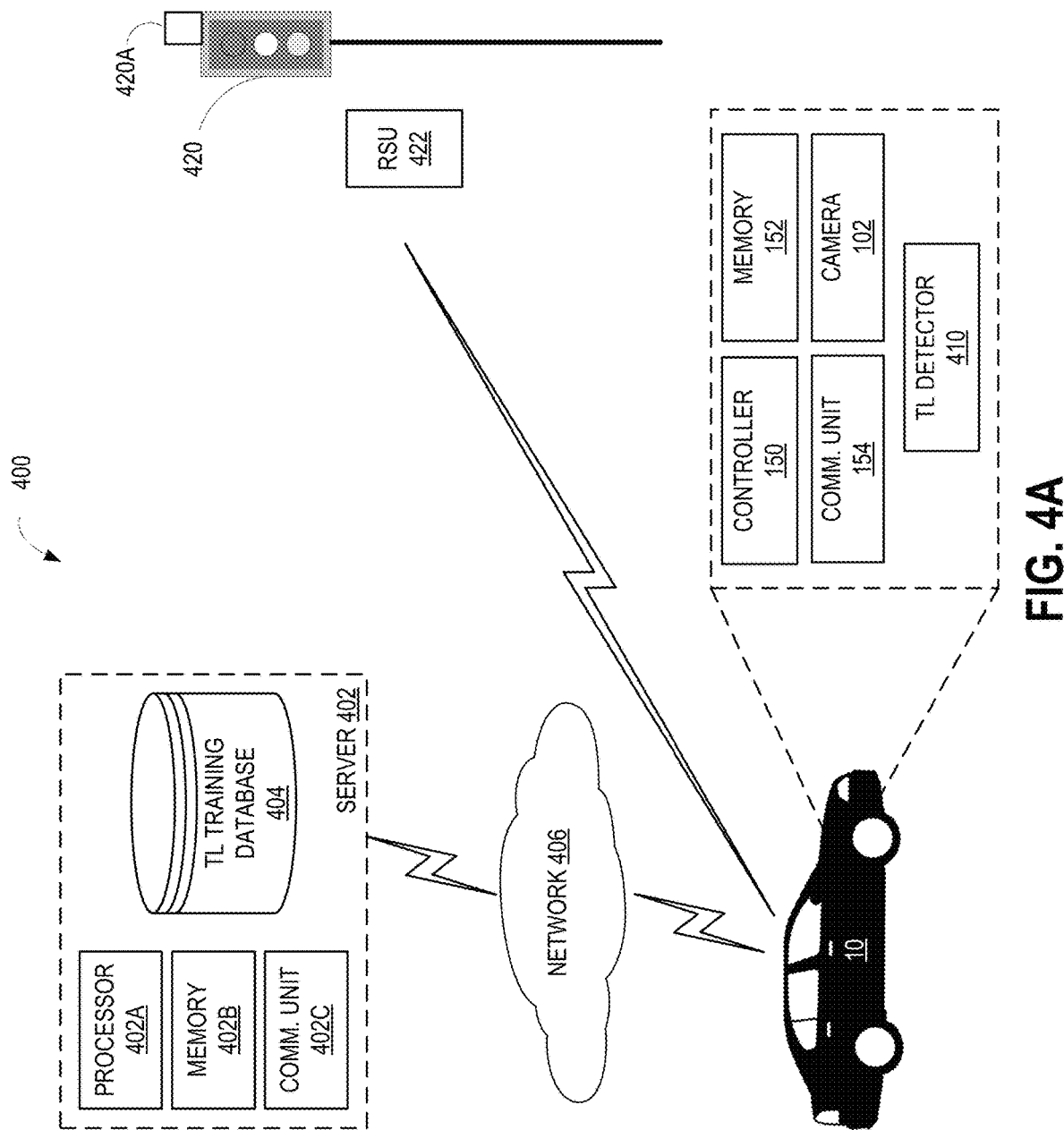
FIG. 4A illustrates an example traffic light detection and processing system in accordance with various embodiments.
Figure 4B:
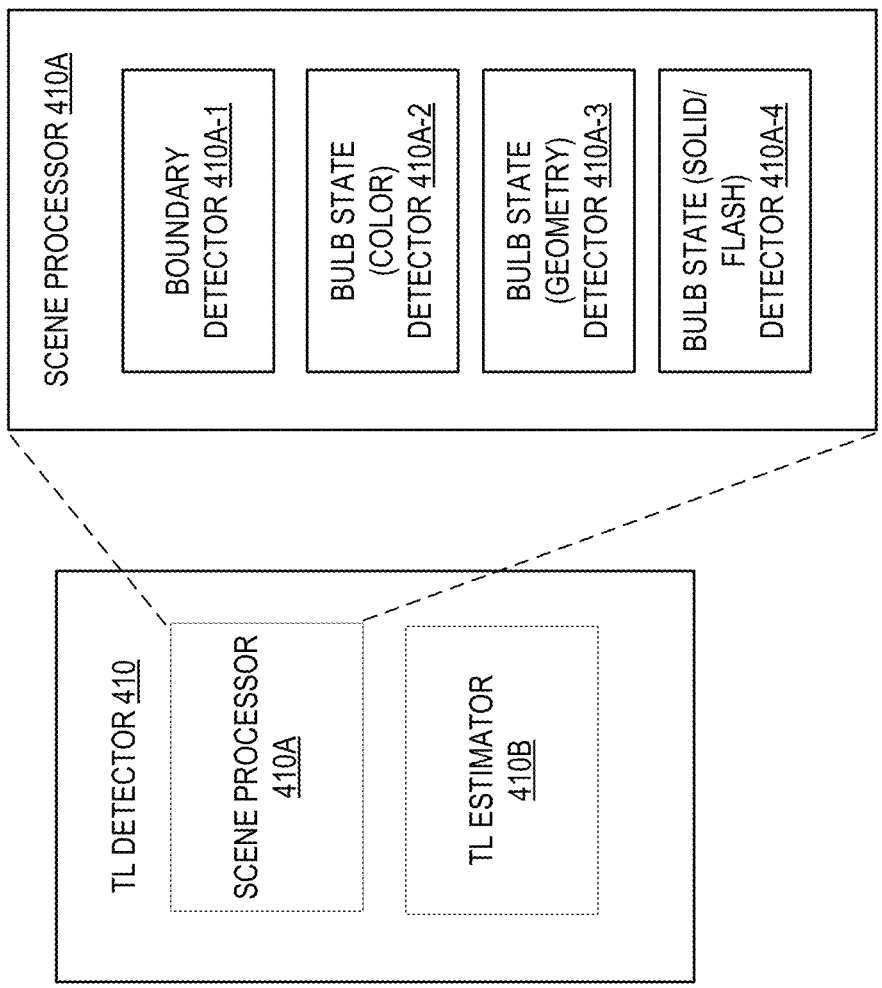
FIG. 4B illustrates aspects of the example traffic light detection and processing system of FIG. 4A in greater detail.
Figure 4C:
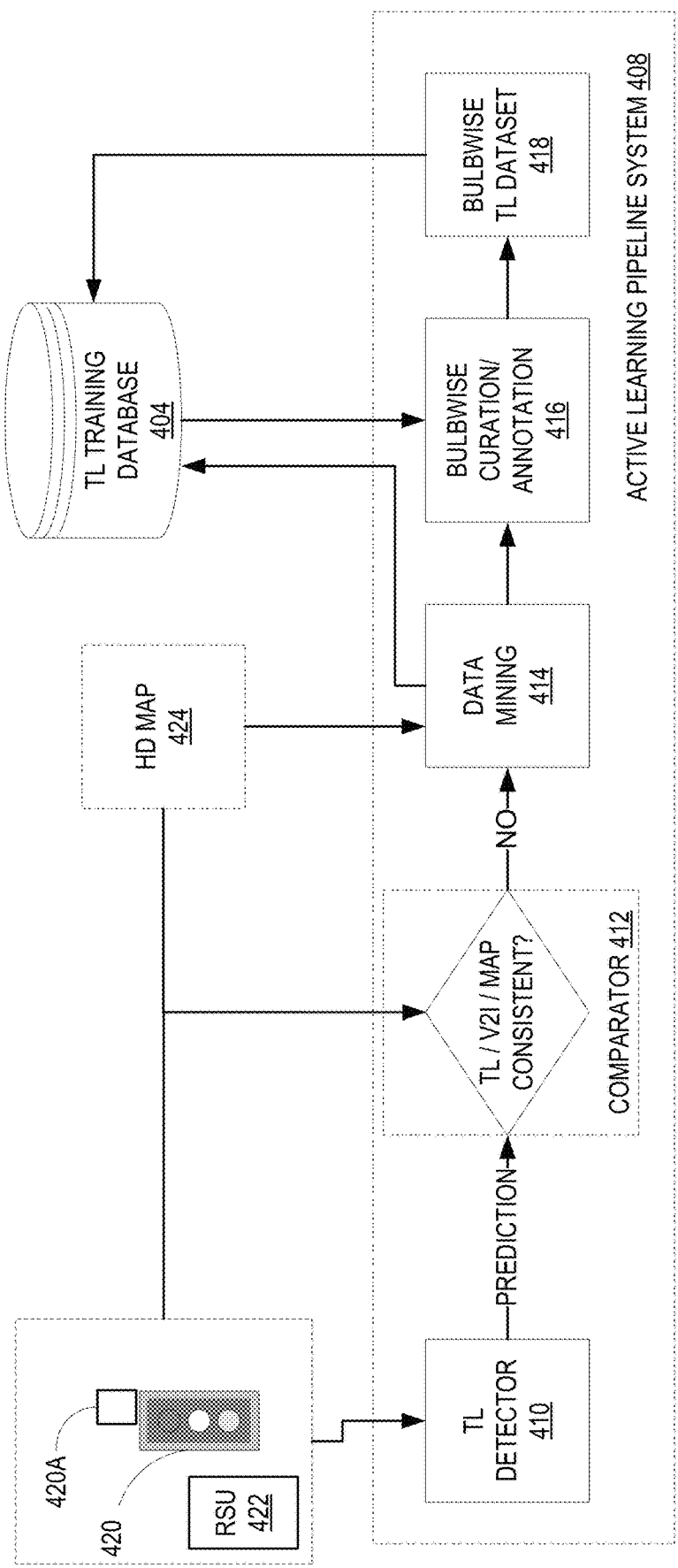
FIG. 4C illustrates an example active learning pipeline for traffic light detection in accordance with various embodiments.

FIGS. 4A-4C illustrate a system 400 and component parts of the system 400 for traffic light perception/detection along with an active learning pipeline in accordance with one embodiment. System 400 includes a server 402, vehicle 10, and a network 406 over which vehicle 10 may communicate with server 402. It should be noted that in this embodiment, vehicle 10 may be collecting data by traversing various roadways, the collected data including images of traffic signals, one of which may be traffic signal 420. As previously discussed, vehicle 10 may include one or more sensors 102, at least one of which may be a camera that can capture images of traffic signals, such as traffic signal 420. It should be understood that system 400 is an example, and system 400 in addition to other systems contemplated in accordance with the present disclosure may include additional and/or fewer components, may combine components, and/or divide one or more of the components into additional components, etc. For example, system 400 may include any number of vehicles and servers.

Network 406 can be a conventional type, wired or wireless, and may have numerous different configurations including a star configuration, token ring configuration, or other configurations. Furthermore, the network 406 may include one or more local area networks (LAN), wide area networks (WAN) (e.g., the Internet), public networks, private networks, virtual networks, peer-to-peer networks, and/or other interconnected data paths across which multiple devices may communicate. For instance, the network 406 may include a vehicle-to-vehicle (V2V) network, a vehicle-to-infrastructure/infrastructure-to-vehicle network (V2I), etc.

The network 406 may also be coupled to or include portions of a telecommunications network for sending data in a variety of different communication protocols. In some embodiments, the network 406 includes Bluetooth communication networks or a cellular communications network for sending and receiving data including via short messaging service (SMS), multimedia messaging service (MMS), hypertext transfer protocol (HTTP), direct data connection, WAP, email, etc. In some embodiments, the network 406 is a wireless network using a connection such as DSRC, WAVE, 802.11p, a 3G, 4G, 5G+ network, WiFi™, or any other wireless networks. Although FIG. 4A illustrates a single block for the network 406 that couples to the server 402 and to vehicle 10, it should be understood that the network 406 may in practice, comprise any number of combination of networks, as noted above.

The server 402 can include a hardware and/or virtual server that includes a processor 402A, a memory 402B, and network communication capabilities (e.g., a communication unit 402C). The server 402 may be communicatively coupled to the network 406. In some embodiments, the server 402 can send and receive data to and from vehicle 10 (as well as other servers, data repositories, and the like, e.g., map data from map database 104 of FIG. 1). The server 402 may include an instance of a traffic light training database 404 that may include data related to a traffic light detector prediction that is inconsistent with V2I data.

The traffic light training database 404 may store data representative of a plurality of annotated traffic lights captured in/as camera images. In FIG. 4A, the server 402 is shown as including the traffic light training database 404, however it should be understood that vehicle 10 and/or another component of the system 400, may additionally and/or alternatively store or cache traffic light training data. For instance, vehicle 10 may include an instance of the traffic light training database 404, may cache data from the traffic light training database 404, etc. For instance, the traffic light training data may be pre-stored/installed vehicle 10, stored and/or refreshed upon setup or first use, replicated at various intervals, updated upon identification of a scenario resulting in incorrect/inconsistent traffic light prediction, etc. In further embodiments, data from the traffic light training database 404 may be requested/downloaded at runtime. Other suitable variations are also possible and contemplated.

As alluded to above, traffic light training data can include, but is not necessarily limited to annotated versions of camera/captured images reflecting traffic lights. For example, a plurality of images of traffic lights in one or more cities, municipalities, regions, etc., may be maintained in traffic light training database 400. In some embodiments, the traffic light training data or dataset can include multiple images captured at a particular frequency. They can include additional annotation attributes, e.g., a traffic light pictogram, orientation or relevancy classes, stereo information comprising disparity images (to allow for stereo-based detection and depth-dependent evaluations). Traffic lights represented by the images can include, but are not limited to bus/tram traffic lights, pedestrian traffic signals, vehicle traffic signals, and the like. Traffic light characteristics that can be represented by annotations regarding viewpoint orientation, relevancy, installation orientation, number of bulbs or light units, bulb state, timestamp, vehicle data (location, velocity, yaw)I, and so on. In some embodiments, traffic light training database 404 may include or be part of a database management system (DBMS) for storing and providing access to data.

Vehicle 10 includes a controller or processor 150, a memory 152, a communication unit 154, and a traffic light detector 410 (described in greater detail below). Processor 150 maybe an embodiment of ECU 150 (FIG. 1), or other suitable processor, which is coupled to other components of vehicle 10, such as one or more sensors, actuators, motivators, etc. Vehicle 10 may send and receive data to and from server 402.

In this example, traffic signal 420 may comprise a vertically-oriented traffic signal having three bulbs that upon illumination reflect the colors red, yellow, and green (from top to bottom). Memory 152 of vehicle 10 may capture data, e.g., images (video, still) or frames, captured by camera 102 of traffic signal 420, which may be provided to traffic light detector 410 (as will be described below and in conjunction with FIGS. 4B and 4C). Depending on the outcome, in some instances, the captured data can be uploaded to traffic light training database 404, e.g., when a predicted traffic light state/condition is inconsistent with that reflected by V2I information.

Regarding the V2I information, FIG. 4A illustrates traffic signal 420 as being operatively connected to a V2I component or element 420A that allows traffic signal 420 to communicate traffic signal data (e.g., state, operating condition) to connected vehicles, e.g., V2I/V2V/V2X-capable vehicles. That is, V2I component 420A may transmit information regarding the state/operating condition of traffic signal 420, e.g., what bulb of traffic signal 420 is currently illuminated/active (green, red, yellow). In some embodiments, V2I information regarding traffic signal 420 may also include information regarding a particular lane(s) of a road or intersection that traffic signal 420 may control. Still other related information can be gleaned by V2I component 420A from traffic signal 420. In other embodiments, V2I communications may be effectuated via a roadside unit/equipment (RSU/RSE) 422. Similar to V2I component 420A, RSU 422 may communicate with and obtain relevant operating conditions/state information regarding traffic signal 420 which can then be relayed to a vehicle, such as vehicle 10, as would be understood by those of ordinary skill in the art. That is, although not illustrated, similar to vehicle 10, RSU 422/V2I component 420A may comprise at least a controller/processor, memory, and communications unit. The controller/processor may handle receipt of/capturing, in this case, traffic light data from traffic light 420, processing the data as needed, storing/caching the data in memory, and conveying the data to vehicle 10.

FIG. 4B depicts a block diagram of an example traffic light detector 410 which may, in part, make up active learning pipeline system 408 (shown in FIG. 4C). Traffic light detector 410 may be any currently or future known machine learning model-based traffic light prediction system or mechanism. In some embodiments, traffic light detector 410 may include at least a scene processor 410A, and a traffic light estimator 410B operationalized in a vehicle, e.g., vehicle 10. It should be understood that the traffic light detector 410 may include additional components such as, but not limited to, a configuration engine, a training engine, an encryption engine, etc., and/or these various components may be combined into a single engine or divided into additional engines.

Scene processor 410A and traffic light estimator 410B may be implemented as software, hardware, or a combination of the foregoing. In some embodiments, traffic light estimator 410B may be controlled by/operated by control unit 112 and/or ECU 110.

Scene processor 410A may be communicatively coupled to camera 102 and/or memory 152 to receive the captured image data, and may process the image data to extract various types of scene (in this context, traffic light) information, i.e., one or more of the aforementioned traffic light characteristics/states/aspects. The image data may include images captured at a certain rate/interval (e.g., every 0.5 s, 1 s, 3 s, etc.) as vehicle 10 travels along a road. In some embodiments, the capturing interval may vary depending on particular time of the day and/or scene-level context. For example, camera 102 may capture traffic signals images more frequently during peak hours, for example, 8 am to 10 am and 5 pm to 7 pm on weekdays. In some embodiments, camera 102 may adjust the capturing interval based on the scene-level context determined by the traffic light recognition application 404. For example, camera 102 may capture traffic signal information every 0.2 s when heavy traffic and/or congestion occurs, and/or in accordance with transition sequences that can change according to traffic. In further embodiments, the capture rate/interval may be a standard frame rate.

In some embodiments, the scene processor 410A may include one or more components for processing the road scene data to determine one or more scene information. As illustrated in FIG. 4B, an example scene processor 410A for processing a road scene may include a boundary detector 410A-1, a bulb color detector 410A-2, a bulb geometry detector 410A-3, and a bulb flashing state detector 410A-4.

It should be understood that traffic signals may control multiple lanes of traffic, and each traffic signal may have multiple bulbs or bulb groups, where one or more bulb groups may be used to control transitions (red to green, green to yellow, etc.). One or more lights, bulb groups, shapes, etc. are factors to consider when vehicle 10 wishes to traverse an intersection, for example. A boundary (or bounding box) is used to detect whether or not some portion of a captured image of a view, e.g., views 200 (FIG. 2) or 300 (FIG. 3) includes a traffic light. Bounding boxes/sliding windows can be "slid" across an image and a classifier can check to see if the content within the bounding box is a traffic light.

A traffic light bulb's color state can reflect bulb color characteristics of a bulb that's illuminated, e.g., green, yellow, or red. As alluded to above, in some regions, only one bulb of a traffic signal will be illuminated, and so upon detecting the existence of and labeling an image as a traffic light, the next detection may be a detector detecting the color associated with an illuminated bulb in the detected traffic signal. However, in other regions, multiple bulbs may be illuminated. Again, in Japan, traffic signals may have multiple rows of bulbs, with, e.g., two bulbs, one in each row, being illuminated.

A bulb's geometry or geometric state, e.g., whether the bulb shape is round, an arrow, a particular arrow, an outline of a pedestrian (not shown), a direction of the arrow (also not shown), etc. is another characteristic/aspect that can be perceived. In this way, an image containing what has been determined/labeled to be a traffic light, and subsequent to detecting/labeling the image as representing a traffic light with an illuminated green bulb, for example, a detector can determine the shape of the illuminated bulb(s).

Yet another characteristic of a traffic signal that may be perceived is the bulb's flashing state," i.e., whether the bulb that is illuminated is flashing or is solid. As should be understood, certain traffic signals direct vehicular traffic through the use, not only of color and shape, but also by whether or not a traffic light bulb is blinking or not (solid). For example, in the United States, a flashing green bulb on a traffic signal may indicate that that the traffic signal is pedestrian activated, therefore signaling to oncoming vehicles that caution should be used in the event the oncoming vehicles must stop to let a pedestrian cross. In Canada, a flashing green bulb signals to an oncoming vehicle that it is permitted to turn left prior to opposing traffic being allowed to enter the intersection.

In some embodiments, the scene processor 410A may extract one or more parameters from the image sensor data, etc. using a vision algorithm. For example, the boundary detector 410A-1 may identify a boundary within which a traffic light may be detected. In some embodiments, the bulb color detector 410A-2 may process the input image data to determine an illumination color of one or more bulbs of a detected traffic light. In some embodiments, the bulb geometry detector 410A-3 may determine a geometry of a particular bulb(s) in a detected traffic light, e.g., traffic signal 420.

It should be noted that traffic light estimator 410B can be used to bootstrap prediction of traffic light perception. For example, fine-grained model prediction/estimation can be compared with high-level annotations that act as a sanity check/feedback comparison. In some embodiments the system 400 can use preceding labels to bootstrap later annotations and at differing levels of the hierarchical ontology. For example, if a first annotation creates a conflict or impossibility with a second annotation, depending on the hierarchical ontology structure/order, an assumption(s) can be made regarding the correctness of either the first or second annotation. It should be understood that this prediction bootstrapping is separate from the validation/confirmation between the output of traffic light estimator 410B that, as described below, can be compared to the V2I information.

FIG. 4C depicts a block diagram representative of active learning pipeline system 408. Traffic light detector 410, one embodiment of which has been described above, may handle the perception of traffic signals that vehicle 10 may encounter during travel. As described above, traffic light detector 410 may perceive one or more traffic signals, such as traffic light 420, and can make predictions/estimate a corresponding state of the one or more traffic signals. For example, upon vehicle 10 approaching traffic light 420, traffic light detector 410 may sense the presence of traffic light 420, and determine that traffic light 420, at that time, is in a state where a green, round bulb is active, indicating a go condition for the lane(s) traffic light 420 controls.

V2I information regarding the presence and state/condition of traffic light 420 may also be obtained, e.g., from V2I component 420A and/or RSU 422. For example, V2I component 420A and/or RSU 422 may periodically gather state/condition information or data from traffic light 420, which it may then transmit to a V2I-capable vehicle, such as vehicle 10. For example, V2I component 420A and/or RSU 422 may broadcast, may transmit, or may be accessed to obtain such information or data, e.g., traffic light Signal Phase and Timing (SPaT) messages.

As described above, V2I information can be considered or used to represent validating or comparative data against which predictions from traffic light detector 410 may be compared. Thus, active learning pipeline system 408 may further include a comparator 412 that compares a prediction from traffic light detector 410 to V2I information regarding traffic light 420. For example, the output of traffic light detector 410 may be a prediction output from traffic light estimator 410B (FIG. 4B) which can be, e.g., a signal, indication, notification, instruction, or other information element or set of information indicating some perceived state or condition of traffic light 420. In some embodiments the output may be a go/no go or go straight/go right or other directionally-based instruction or indication. This prediction output may be compared to a similar signal, indication, information or data element/set, etc. from v2I component 420A or RSU 422. For example, V2I information may indicate a transition state of a traffic light associated with traversing lanes of an intersection. That is, traffic light 420 may control entry through an intersection from a first lane to a second lane. At some point, the V2I information may indicate that the transition state from the first to the second lane is red. If the traffic light detector 410 predicts the state transition of light 420 from the first to the second lane is green/yellow, active learning pipeline system 408, in particular, data mining component 414, can be triggered to collect the relevant data associated with the transition state provided vis-à-vis the V2I information and predicted by the traffic light detector 410.

It should be understood that active learning pipeline system 408 can operate in real-time. That is, while vehicle 10 is traveling, it may make predictions regarding traffic signals it nears/encounters. Upon perceiving a traffic light, comparator 412 will compare the prediction output to V2I information obtained regarding the same traffic light. If the prediction output matches the V2I information, e.g., both the prediction output and the V2I information reflect a perception that traffic light 420 is directing vehicles to proceed straight, for example, the prediction output can be used to direct, e.g., ECU 110/control unit 112 to activate/de-activate one or more actuators 114, to operate and control operation of the vehicle 10 accordingly. in other embodiments, if V2I information regarding a traffic light, that V2I information is given precedence over the prediction output, and the V2I information may be used by ECU 110/control unit 112 to activate/de-activate one or more actuators 114 so vehicle 10 may operate commensurate with the V2I information.

In the event the prediction output from traffic light detector 410 and the V2I information from V2I component 420A and/or RSU 422 are inconsistent/do not match each other, in some embodiments, the V2I information overrides that of traffic light detector 410. In some embodiments, a warning may be provided to the driver or operator of vehicle 10 via, e.g., HMI 108, along with an option/providing the ability for the driver/operator to assume manual control of vehicle 10.

Moreover, and in the event that the prediction output regarding a traffic light from traffic light detector 410 is inconsistent with the V2I information regarding the same traffic light, images of the traffic light captured, e.g., by camera 102 (FIG. 4A), may be sent to data mining component 414, which can be, e.g., a communications unit or part of a communications unit, such as communications unit 154 (FIG. 4A). In other embodiments, data mining component 414 may be a separate component that can obtain image data regarding a traffic light, e.g., traffic light 420, and transmit that image data to traffic light training database 404. In some embodiments, the image data is the same image data used by traffic light detector 410 to generate its prediction output (that was inconsistent with the V2I information). In other embodiments, other/additional image data may be obtained by data mining component 414 and sent to traffic light training database 404 to update the training dataset presently maintained by traffic light training database 404. For example, the timestamp associated with the image data used by traffic light detector 410 to generate its prediction output can be used as a "base" timestamp relative to which other image data can be captured. For example, data mining component 414 may obtain image data captured by camera 102 (and, e.g., cached in memory 152) at X seconds before and X seconds after the base timestamp. In other embodiments, some other specified window of time around/about the timestamp may provide a basis for which image data can be obtained.

In some embodiments, data mining component 414 may be configured or programmed to obtain certain types of data or information regarding traffic signals. For example, types of information (images) maintained by traffic light training database 404 can be monitored to determine whether information regarding certain traffic light operating conditions or characteristics/aspects is sparse relative to other types of information. For example, "rare" or uncommon traffic light characteristics may be targeted for data acquisition. That is, data mining component 414 can, based on the current traffic light training dataset maintained by traffic light training database 404, obtain information, such as traffic light images captured by camera 102 regarding the aforementioned rare or uncommon traffic light characteristics. In this way, more samples regarding less-encountered traffic light scenarios can be captured and used to better train traffic light detector 410, and better balance the training dataset, data classes captured therein, etc.

It should be understood that the parameters or conditions used to determine when additional traffic light data should be captured and uploaded to traffic light training database 404 can be programmable. For example, a vehicle manufacturer or municipality (leveraging information-gathering capabilities of vehicles, such as vehicle 10) may wish to collect information regarding certain scenarios, such as traffic light transitions. Hence, parameters such as time periods or windows near, about, before, after a particular condition or occurrence can be specified as time periods or windows during which traffic light information is to be obtained. Hence, in response to, or even absent a determination that the prediction output from traffic light detector 410 is inconsistent with V2I information, memory 152 can be accessed. Images captured by camera 102 can be obtained from memory 152 which fall within the specified parameters, e.g., images captured within a specified time period before/after a particular occurrence or event.

In some embodiments, active learning pipeline system 408 may be implemented in multiple vehicles that belong to a vehicle fleet. In this way, data regarding traffic lights can be gathered from different sources, which may provide better data diversity upon which traffic light detector 410 may be trained. For example, vehicles of a vehicle fleet may traverse the same section(s) of roadway(s), encounter the same traffic signal(s), etc. Data mining component 414 can be configured to, e.g., gather information regarding a particular traffic light. In this way, each vehicle may capture images that can be uploaded to traffic light training database 404, where the various images will typically reflect different perspectives, views, inclusion/exclusion of occluding objects, etc. which can all result in differing prediction outputs. Thus, such information can be used to provide more universal/comprehensive training for traffic light detector 410 across the fleet of vehicles.

In this way, active learning pipeline 408 can selectively sample traffic light data or information for use as part of a model training set, in this example, the model on which traffic light detector 410 may be based. Such selective sampling can provide the most useful information with which to train traffic light detector 410. Indeed, if traffic light detector 410 is able to accurately perceive a traffic signal, it is/has been properly trained. It is cases where traffic light detector 410 incorrectly perceives a traffic signal that would be informative to traffic light detector 410. Moreover, as alluded to above, the amount of data or information that is exchanged between a vehicle and server 402 can be reduced. Rather than upload all collected data, e.g., traffic light images, only those that, again, are most/more informative, may be uploaded and used as part of the training dataset for traffic light detector 410. Moreover, active learning pipeline system 408 can provide continuous learning for traffic light detector 410.

In some embodiments, information regarding traffic signals, e.g., traffic light 420, may be gleaned or obtained from a high definition (HD) map, such as HD map 424. In some embodiments, HD map 424 may be an embodiment of map database 104 (FIG. 1). That is, in some embodiments, one or more bulb groups are defined in the HD map 424. In some embodiments, the one or more bulb groups are defined relative to a lane or lanes of roadway controlled by the traffic light in the HD map 424. In some embodiments, HD map 424 may be used as a secondary or additional bootstrapping mechanism/source of information similar to V2I information. Thus, if HD map 424 contains or can provide information regarding a particular traffic light, HD map 424 information can be used as/treated as validating or comparative information against which prediction outputs from traffic light detector 410 may be compared. In some embodiments, data from HD map 424 may be uploaded as supplemental data for updating the traffic light training data maintained by traffic light training database 404. In still other embodiments, information from HD map 424 can be used in conjunction with V2I information to determine consistency with traffic light detector 410 prediction outputs. In some embodiments, HD map 424 data may exist, but V2I information is not available (either because no V2I component or RSU is present to relay traffic light information to vehicle or because such V2I information is unavailable, due to the roadway being new, RSU failing, etc.) Again, data from HD map 424 can provide data diversity and better data distribution in a traffic light training dataset. In still other embodiments, to interpret either or both V2I information and traffic light predictions or translate such data, HD map 424 can provide such interpretation/translation. For example, HD map 424 may provide the requisite information for associating a detected traffic light to a state transition/trajectory to allow V2I information comparison, and may, in some embodiments, also inform traffic light detector 410 of a traffic light's state of a current transition.

Active learning pipeline system 408 may further comprise bulbwise curation/annotation component 416 and bulbwise traffic dataset 418.

That is, it should be understood that supervised machine learning involves a model memorizing or learning from real-world, e.g., human demonstrations to achieve pattern recognition. Accordingly, bulbwise curation/annotation component 416 may annotate, e.g., assign a category, label, type, or other relevant designation or identification to a data element, e.g., image, which can then be used to train the model. As described above, some machine learning systems/methodologies may include human labelers/annotators as part of data processing/model training. Accordingly, bulbwise curation/annotation component 416 may be embodied as a human annotator. For example, upon analyzing captured image data of a traffic signal, such as traffic signal 420, and determining that a green bulb is illuminated, that image may be labeled as such.

In some embodiments, automatic annotation may be performed. For example, in some embodiments, depending on the labeling of or determinations regarding states/conditions of, e.g., preceding levels or characteristics in an applicable ontology, a state/condition/characteristic of the traffic signal can be assumed, negating the need for human annotator (at least in some stages of data processing). Thus, bulbwise curation/annotation component 416 may be embodied as an automated annotator.

Bulbwise curation/annotation component 416 may output an annotated dataset to train the models in/of traffic light estimator 410B (FIG. 4B). This annotated dataset comprises traffic light training data that can be maintained in traffic light training database 404. Traffic light estimator 410B may then be operative while a vehicle, e.g., vehicle 10 is in use to infer the state(s) of traffic lights that are encountered, i.e., estimate or predict the state/condition of a detected traffic signal. In some embodiments, traffic light estimator 410B may be implemented in/as part of a simulation, or any other system/context in which traffic light estimation is to occur. It should be noted that bulbwise curation/annotation component 416 may be embodied elsewhere in accordance with some embodiments. For example, bulbwise curation/annotation component 416 may be implemented off-vehicle, e.g., on server 402 (FIG. 4A). It should be understood that bulbwise curation/annotation component 416 may provide data collection, data extraction/transformation, data annotation, and dataset management functionalities within active learning pipeline system 408.

Thus, data obtained by data mining component 414, e.g., traffic light images deemed to result in inconsistencies relative to V2I and/or HD map data can be labeled to properly characterize the traffic light images. Subsequent to annotation, that data can become a bulbwise traffic light training dataset 418. As noted above, traffic light detection or perception can be based on bulbwise detection/perception, where a traffic light can be thought of as a group(s) of individual bulbs having their own shape, color, transition states, etc. An example of a bulbwise traffic light detection or perception system may be found in U.S. application Ser. No. 16/984,006, which is incorporated herein by reference in its entirety.

Figure 5:
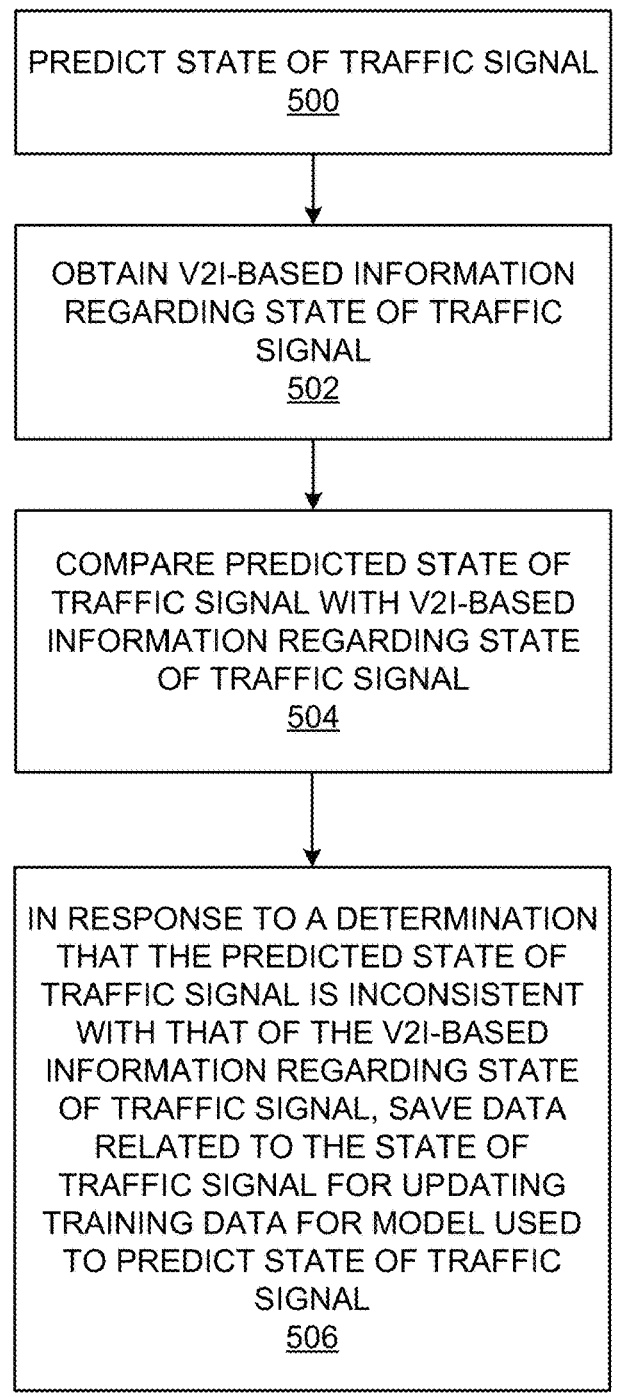
FIG. 5 is a flow chart illustrating traffic light perception and active learning in accordance with one embodiment.

FIG. 5 is a flow chart illustrating example operations that may be performed to train a traffic signal detection and prediction/recognition machine learning model that can then recognize traffic light states encountered during vehicle use vis-à-vis an active learning pipeline.

At operation 500, the state of a traffic signal may be predicted or perceived. That is, evidence of one or more traffic signals may be detected from a plurality of images. As noted above, one or more image datasets including potential evidence of the existence of traffic signals may be analyzed to determine if in fact, traffic signals are present therein. Boundaries can be specified to assist in making this determination as also described above. Moreover, a traffic light detector can be used to determine the state of the detected traffic light, e.g., whether it is active, and if so, what bulb/group of bulbs is active/illuminated, what color of bulb/group of bulbs is active, and so on. As noted above, an active learning pipeline may be used to provide better (more diverse, more considerate of outlier scenarios, etc.) training data to a traffic light detector machine learning model so that the traffic light detector can be made to generate more accurately perceive/predict a traffic signal.

Thus, at operation 502, V2I-based information regarding the state of the traffic signal can also be obtained. It should be understood that V2I-based information can be considered a baseline characterization/perception of a traffic signal. In some embodiments, as described above, V2I-based information may not be available, in which case, as an alternative, HD map information, if available, can act as validating or comparative information. In some embodiments, the HD map information may be used to further bootstrap the traffic light detector prediction and/or the V2I-based information. V2I information can be received/obtained in a variety of ways, e.g., by componentry co-located with a traffic signal, through a separate RSU, etc. In some embodiments, V2I-based information may originate from a third party information service provider that may provide traffic signal information to subscribers of its service, etc. It should be noted that while various embodiments disclosed herein are described in the context of V2I information, traffic signal information can also be obtained through other V2V/V2X communications, or other mechanisms. Thus, any trusted or perceived to be trustworthy source(s) of traffic signal detection/perception information may be used in accordance with various embodiments to bootstrap or validate traffic light detector predictions.

At operation 504, the predicted state of the traffic signal is compared with the V2I-based information regarding the state of the traffic signal. As noted above, certain translations/transformations of V2I and/or prediction outputs from a traffic light detector may be performed to allow the V2I-based information to be compared to the predicted state. The comparison is performed to determine if the predicted state of the traffic signal comports with, in this instance, the V2I-based information. If not, information relevant to the false/inconsistent prediction can be used as training data to better train the traffic light detector machine learning model.

Therefore, in response to a determination that the predicted state of the traffic signal is inconsistent with that of the V2I-based information, data related to the state of the traffic signal is saved for updating the training data for the traffic light detector machine learning model. For example, and as described above, data, e.g., captured images with a similar timestamp (e.g., 2 seconds before and after a timestamp of interest) may be obtained. It should be understood that upon determining some timestamp or event of interest (i.e., a traffic light characteristic/state/scenario resulting in the inconsistent prediction), a plurality of data gathering techniques may be utilized. In the case of a vehicle fleet for example, upon identifying some event of interest, other (related) instances experienced by other vehicles in the vehicle fleet may be captured and separately sent for annotation and ultimately used to update a training dataset. In some examples, other sources of traffic signal data/images/etc. can be accessed and relevant data/images/etc. can be obtained. For example, environmental conditions (weather, occluding objects, etc.) may have contributed to the inaccurate or at least, inconsistent traffic light perception. Accordingly, any information/data that can be captured regarding those environmental conditions may be useful in annotating captured images. It should be understood that these are only examples, and not meant to be limiting in any way.

It should be understood that the embodiments described herein are non-limiting examples. For example, although example traffic light systems described herein include more "standard" traffic lights including circular light/bulb indicators, as well as arrow indicators, various embodiments may be adapted to perceive traffic light systems that display text (e.g., "STOP" or "PROCEED"), other shapes (e.g., pedestrian walk/no walk indicators, wildlife crossing warnings, railroad crossing indicators), and the like.

Figure 6:
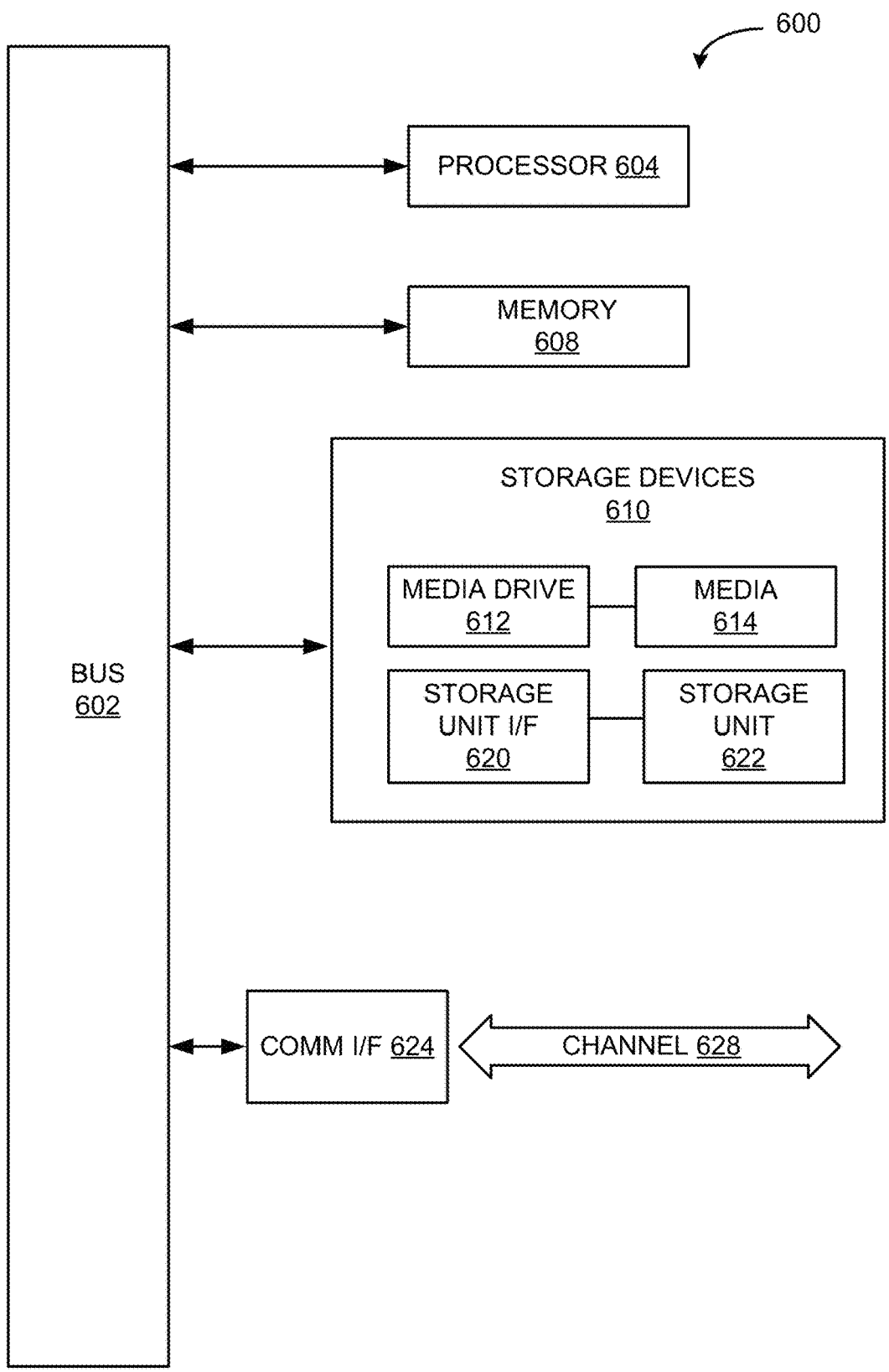
FIG. 6 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 6. Various embodiments are described in terms of this example-computing component 600. After reading this description, it will become apparent to a person skilled in the relevant art how to implement the application using other computing components or architectures.

Referring now to FIG. 6, computing component 600 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 600 might also represent computing capabilities embedded within or otherwise available to a given device. For example, a computing component might be found in other electronic devices such as, for example, portable computing devices, and other electronic devices that might include some form of processing capability.

Computing component 600 might include, for example, one or more processors, controllers, control components, or other processing devices. This can include a processor 604. Processor 604 might be implemented using a general-purpose or special-purpose processing engine such as, for example, a microprocessor, controller, or other control logic. Processor 604 may be connected to a bus 602. However, any communication medium can be used to facilitate interaction with other components of computing component 600 or to communicate externally.

Computing component 600 might also include one or more memory components, simply referred to herein as main memory 608. For example, random access memory (RAM) or other dynamic memory, might be used for storing information and instructions to be executed by processor 604. Main memory 608 might also be used for storing temporary variables or other intermediate information during execution of instructions to be executed by processor 604. Computing component 600 might likewise include a read only memory ("ROM") or other static storage device coupled to bus 602 for storing static information and instructions for processor 604.

The computing component 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a solid-state drive, a magnetic tape drive, an optical drive, a compact disc (CD) or digital video disc (DVD) drive (R or RW), or other removable or fixed media drive might be provided. Storage media 614 might include, for example, a hard disk, an integrated circuit assembly, magnetic tape, cartridge, optical disk, a CD or DVD. Storage media 614 may be any other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing component 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory component) and memory slot. Other examples may include a PCMCIA slot and card, and other fixed or removable storage units 622 and interfaces 620 that allow software and data to be transferred from storage unit 622 to computing component 600.

Computing component 600 might also include a communications interface 624. Communications interface 624 might be used to allow software and data to be transferred between computing component 600 and external devices. Examples of communications interface 624 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 624 may be carried on signals, which can be electronic, electromagnetic (which includes optical) or other signals capable of being exchanged by a given communications interface 624. These signals might be provided to communications interface 624 via a channel 628. Channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 600 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method, comprising:
   predicting a state of a traffic signal using a model;
   obtaining vehicle-to-infrastructure (V2I)-based information regarding the state of the traffic signal;
   comparing the predicted state of the traffic signal with the V2I-based information regarding the state of the traffic signal;
   in response to a determination that the predicted state of the traffic signal is inconsistent with that of the V2I-based information regarding the state of the traffic signal, updating training data by saving data related to the state of the traffic signal; and
   training the model used to predict the state of the traffic signal using the updated training data.

2. The method of claim 1, further comprising translating at least one of the predicted state of the traffic signal and the V2I-based information regarding the state of the traffic signal to a common format to facilitate the comparison.

3. The method of claim 1, further comprising annotating the saved data.

4. The method of claim 1, wherein the saved data is related to the state of the traffic signal based on at least one timestamp common to or within a time period associated with one or more captured images on which the predicted state of the traffic signal is based.

5. The method of claim 1, further comprising uploading the saved data to a training dataset database.

6. The method of claim 5, further comprising, in response to a determination that the predicted state of the traffic signal is consistent with that of the V2I-based information regarding the state of the traffic signal, not uploading data upon which the predicted state of the traffic signal is based to the training dataset database.

7. The method of claim 1, further comprising receiving high definition map-based information regarding the state of the traffic signal.

8. The method of claim 7, further comprising further comparing the received high definition map-based information with the predicted state of the traffic signal.

9. The method of claim 1, wherein the saved data comprises, at least in part, the received high definition map-based information.

10. A vehicle including a traffic light recognition system, comprising:
a camera;
traffic light detector circuitry controlled by a control unit operative to:
predict a state of a traffic signal based on one or more images of the traffic signal captured by the camera and application of a machine learning model to the one or more images;
obtain vehicle-to-infrastructure (V2I)-based information regarding the state of the traffic signal;
compare the predicted state of the traffic signal with the V2I-based information regarding the state of the traffic signal;
in response to a determination that the predicted state of the traffic signal is inconsistent with that of the V2I-based information regarding the state of the traffic signal, update a training dataset with the one or more images; and
train the machine learning model using the updated training data.

11. The vehicle of claim 10, wherein the control unit is further operative to translate at least one of the predicted state of the traffic signal and the V2I-based information regarding the state of the traffic signal to a common format to facilitate the comparison.

12. The vehicle of claim 10, wherein the traffic light detector circuitry controlled by a control unit is further operative to:
in response to a determination that the predicted state of the traffic signal is consistent with that of the V2I-based information regarding the state of the traffic signal, prevent the updating of the training dataset with the one or more images.

13. The vehicle of claim 10, wherein the traffic light detector circuitry controlled by a control unit is further operative to:
receive high definition map-based information regarding the state of the traffic signal.

14. The vehicle of claim 13, wherein the traffic light detector circuitry controlled by a control unit is further operative to:
further compare the received high definition map-based information with the predicted state of the traffic signal.

* * * * *